Sept. 15, 1953     G. THIELERS ET AL     2,652,508
LOW-FREQUENCY TWO-PHASE COMMUTATOR MACHINE
Filed Oct. 23, 1951
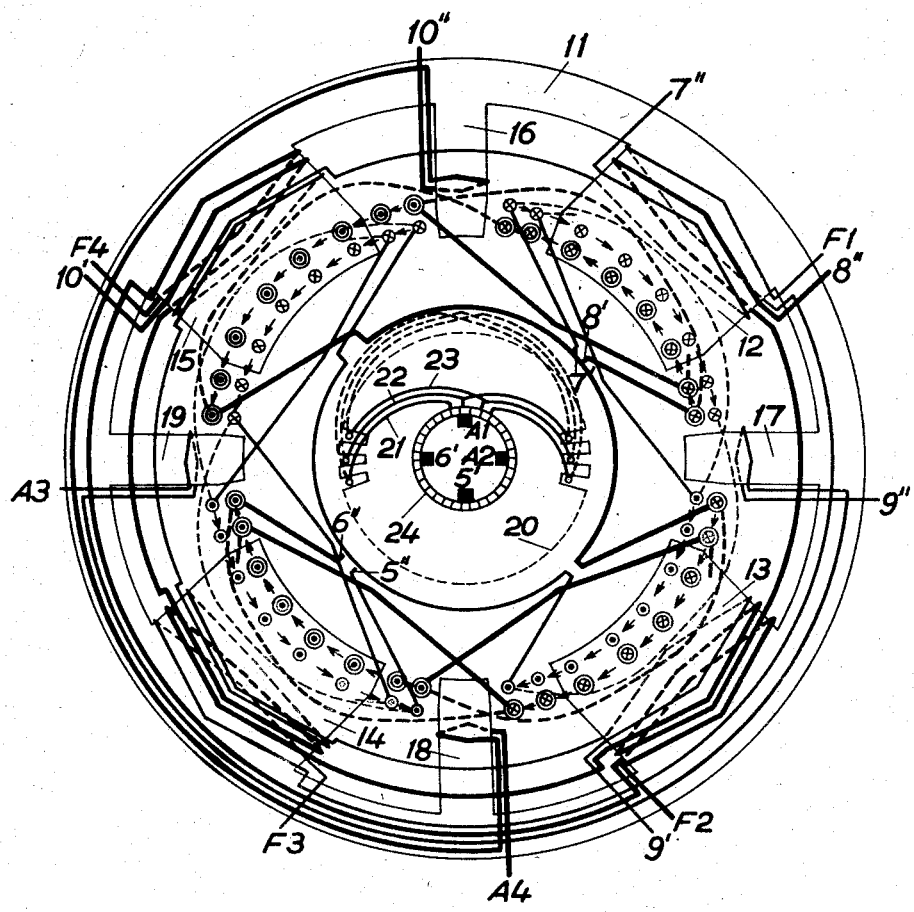
Inventors
Gustav Thielers and
Erik Sjökvist
By
Attorney.

Patented Sept. 15, 1953

2,652,508

UNITED STATES PATENT OFFICE 2,652,508

LOW-FREQUENCY TWO-PHASE COMMUTATOR MACHINE

Gustav Thielers and Erik Sjökvist, Vasteras, Sweden, assignors to Allmanna Svenska Elektriska Aktiebolaget, Vasteras, Sweden, a corporation of Sweden Application October 23, 1951, Serial No. 252,773
In Sweden January 13, 1951

3 Claims. (Cl. 310—173)

The present invention refers to a commutating two-phase alternating current machine for a frequency which is lower than the lowest commercial line frequency.

Such a machine is especially suitable as a low-frequency generator for supplying current to stationary stirring windings of electric furnaces. The purpose of these windings is only, as their name denotes, to stir the charge in a furnace in which the charge has been brought to a molten condition by other means. The frequency of the current to be supplied for obtaining the best stirring effect depends on the size of the furnace, being lower for an increased size of the furnace. In furnaces where such stirring equipment will be economically justified, said frequency will be considerably lower than the lowest commercial line frequency.

The current for feeding the stirring winding has hitherto been derived from one separate generator for each phase of the winding. In principle, the number of phases of such windings is without importance, but it has been found that two phases are most suitable. Irrespective of the number of phases, it is not quite convenient to use a device employing one generator for each phase, owing to the fact, among others, that if the different generators are driven from a common power source, vibrations may easily occur in the shaft which may cause too large mechanical stresses.

The present invention relates to a machine feeding at the same time both or all phases so as to avoid the inconveniences of using two or more machines.

A machine according to the present invention comprises magnetizing poles, commutating poles arranged between them, and windings traversed by the different phase currents for compensating the field of the armature winding. It will be possible to produce such a machine by dividing the magnetizing winding for each phase between at least two pole cores.

In the accompanying drawing one embodiment of the invention is diagrammatically shown, representing a two-phase generator with two electrical poles to which belong four geometrical pole cores and four commutating poles. The generator is intended to feed the stirring winding of an electrical furnace.

In the drawing conductors belonging to different phases are marked by lines of different thickness. For conductors of the phase shown with thick lines, the conductors, as seen endwise, are marked with double circles, and for the phase the conductors of which are represented with thinner lines, the conductors, as seen endwise, are marked with single circles. Conductors at the front side of the machine, which is the commutator side, are shown in full lines, and conductors at the rear side of the machine are shown dotted. For conductors in slots, a cross denotes a conductor leading from front to rear, and a dot denotes a conductor from rear to front.

In the drawing, F1 ... F4 denote the terminals of the magnetizing windings intended to be supplied from a suitable low frequency exciter which is not shown in the drawing. A1 ... A4 denote terminals to which corresponding terminals of the stirring winding of the electrical furnace are to be connected. The latter winding is not shown in the drawing. Reference numbers with different indices indicate the same connection point, i. e. 5' and 5'', 6' and 6''. Terminals designated by letters and odd numbers A1, A3, F1, F3, 5, 7, 9 refer to one phase, and terminals designated by letters and even numbers A2, A4, F2, F4, 6, 8, 10 to the other phase.

In the drawing, 11 denotes the stator of the machine which may be laminated as well as the cores of the magnetising poles 12—15 and the cores of the commutating poles 16—19. The stator as a whole including all pole cores may be built up of laminations. In the rotor 20 only six slots are shown containing coils 21, 22, 23 with a coil pitch which is substantially half the circumference of the rotor, as in this case the stator has twice as many mechanical poles as electrical poles, and the pitch of the rotor winding corresponds to the number of electrical poles. The rotor coils are connected to the segments of a commutator 24 against which four brushes 5', 6', A1, A2 bear.

The magnetizing winding of one phase, for instance that comprised between F1 and F3, is wound on the pole cores 12 and 14, which are excited to alternating polarity. The magnetizing winding of the other phase, thus between F2 and F4, is arranged on the pole cores 13 and 15 in a corresponding way.

In the form shown, the field of the armature winding is compensated by means of three separate windings for each phase, namely, one distributed compensating winding between the points 5'' and 7' for one phase, and between the points 6''—8' for the other phase, said windings being arranged in slots in the magnetizing poles adjacent to the airgap, one concentrated compensating winding between the points 7'' and 9', and between the points 8'' and 10' respectively, around each magnetizing pole core, and one commutating winding between the points 9″ and A3, and between the points 10″ and A4 respectively, on the commutating pole cores.

Consequently the current circuit through the machine for one phase will be the following, starting for instance from A1: through the rotor winding to brush 5′ which is connected to point 5″ of the distributed compensating winding, through this winding to point 7′ which is connected to point 7″ of the concentrated compensating winding which is traversed to point 9′, and further from point 9″ of the commutating winding to terminal A3. As far as the other phase is concerned, the current will flow in a similar way A2—6′, 6″—8′ 8″—10′ 10″—A4.

The distributed compensating winding, which is preferably wound as a lap winding with a coil width of 90 electrical degrees, is distributed along the airgap periphery as uniformly as possible. The slots in the magnetizing pole cores provided for this winding are not shown in the drawing; only the place of the conductors and the current direction being shown. Some coils are arranged in the interpolar space between the magnetizing poles and the commutating poles. These coils are supported by suitably arranged wedges. In order to simplify the drawing, the coil ends are only shown for a couple of coils in each phase, and the proceeding direction of the lap winding is denoted by arrows between the slots. For each phase the winding should be so arranged that its ampere turns oppose those of the armature winding. This condition is fullfilled by an arrangement according to the drawing.

Of course it is also possible to arrange said distributed compensating winding as composed of concentric coils giving an average coil width of 90 electrical degrees. This arrangement, however, is inconvenient for the manufacturing of the coils, as the coil width will be different for each coil belonging to a pair of poles. This difficulty is avoided by means of a winding according to the form shown, as this winding may be arranged as a cylinder winding in which the coils are symmetrical. Nor would a lap winding with a coil width of 180 electrical degrees be advantageous, as the coil ends should then be twice as long as those used in the winding shown.

According to the drawing, the concentrated compensating winding is for each phase evenly divided between all magnetizing pole cores. The winding direction within each phase must assure that two successive magnetizing poles have the same polarity. By this arrangement a compensation of the rising as well as of the descending part of a half-cycle of the M. M. F.-curve of the armature winding is obtained.

By means of the commutating poles which for each phase are series-connected in pairs, in each of which the poles have opposite polarity, the central portion of the half-cycle of said M. M. F.-curve is compensated.

By arranging the compensating windings in accordance with the embodiment shown, the diameter of the stator laminations may be made smaller than if the compensation were achieved by one single distributed compensating winding. According to the invention the M. M. F. of the armature winding is not entirely compensated. The remaining compensation, i. e. that of the central portion of a half-cycle of the M. M. F.-curve of the armature winding, is accomplished by a concentrated compensating winding. It will be seen that if the space in the interpolar gaps is utilized in this way to house a portion of the ampere turns of the compensating winding, this will necessitate a smaller depth of the slot and lower height of the magnetizing poles and consequently smaller radial dimensions of the stator.

If, on the other hand, the concentrated compensating winding, instead of being divided as coils on each main pole core, is arranged to embrace as well the previously mentioned successive magnetizing pole cores with the same polarity as the commutating pole core lying between them, it is possible to make the commutating winding somewhat weaker than is necessary according to the arrangement in the form shown.

By arranging the rotor winding with a coil pitch as previously described, a considerably uneven current distribution between the phases will have only a small influence.

It is possible to choose an arbitrary number of poles for a machine according to the invention and still to maintain the principles described. The choice of said number may be of importance not only in utilizing the machine for stirring equipments but also when it is utilized for purposes other than that dsecribed, where its properties are especially suitable, as for instance for the heating of railroad trains.

A suitable exciter should be provided for the excitation of the machine, giving a current of the desired frequency. Such an exciter may for instance consist of an asynchronous machine with or without a commutator or of a rotating potentiometer or of some kind of electronic generator. Of said alternatives, however, a commutator machine is generally the most suitable, as such a machine will be well utilized, and may transmit a power which is independent of the frequency, contrary to an asynchronous machine without a commutator.

A commutator machine suitable as an exciter for the described generator may have a stator winding connected to brushes placed on adjustable brush yokes. The stator winding may have two phases, and by connecting corresponding phases of a field winding of a machine according to the invention to the brushes in parallel with said stator winding, the field winding may be supplied with a current the frequency of which is determined by the position of said brush yokes. It is also possible to connect the field winding to brushes on separate yokes, whereby the field winding may be supplied with a current, the frequency as well as the voltage of which may be adjustable by moving the respective rings.

We claim as our invention:

1. A low-frequency two-phase commutator machine comprising a stator, a rotor with a commutator, magnetizing poles on said stator, magnetizing windings on said poles, one magnetic pole of the machine including two geometrical pole cores, commutating poles on said stator, commutating windings on said commutating poles, compensating windings arranged on the stator for the compensation of the armature M. M. F. field, said compensating windings comprising two separate windings, one of which is uniformly distributed in slots in said magnetizing pole cores, the other of said compensating windings, a concentrated winding, being arranged on said magnetizing pole cores, the last-mentioned winding being so arranged as to give the same polarity to at least two successive pole cores, a coil winding on said rotor having a coil pitch of substantially 180 electrical degrees, and series connections between said armature winding, compensating windings, and commutating windings.

2. A low-frequency two-phase commutator machine according to claim 1, in which said concentrated compensating winding is divided on all magnetizing pole cores.

3. A low-frequency two-phase commutator machine according to claim 1, in which said concentrated compensating winding includes two successive magnetic pole cores of the same polarity and the commutating pole core therebetween.

GUSTAV THIELERS.
ERIK SJÖKVIST.

No references cited.